3,153,696
METHODS FOR PROCESSING CABLES
André Blanchard, Houston, Tex., assignor, by mesne assignments, to Schlumberger Well Surveying Corporation, Houston, Tex., a corporation of Texas
Filed March 12, 1956, Ser. No. 570,780
7 Claims. (Cl. 174—108)

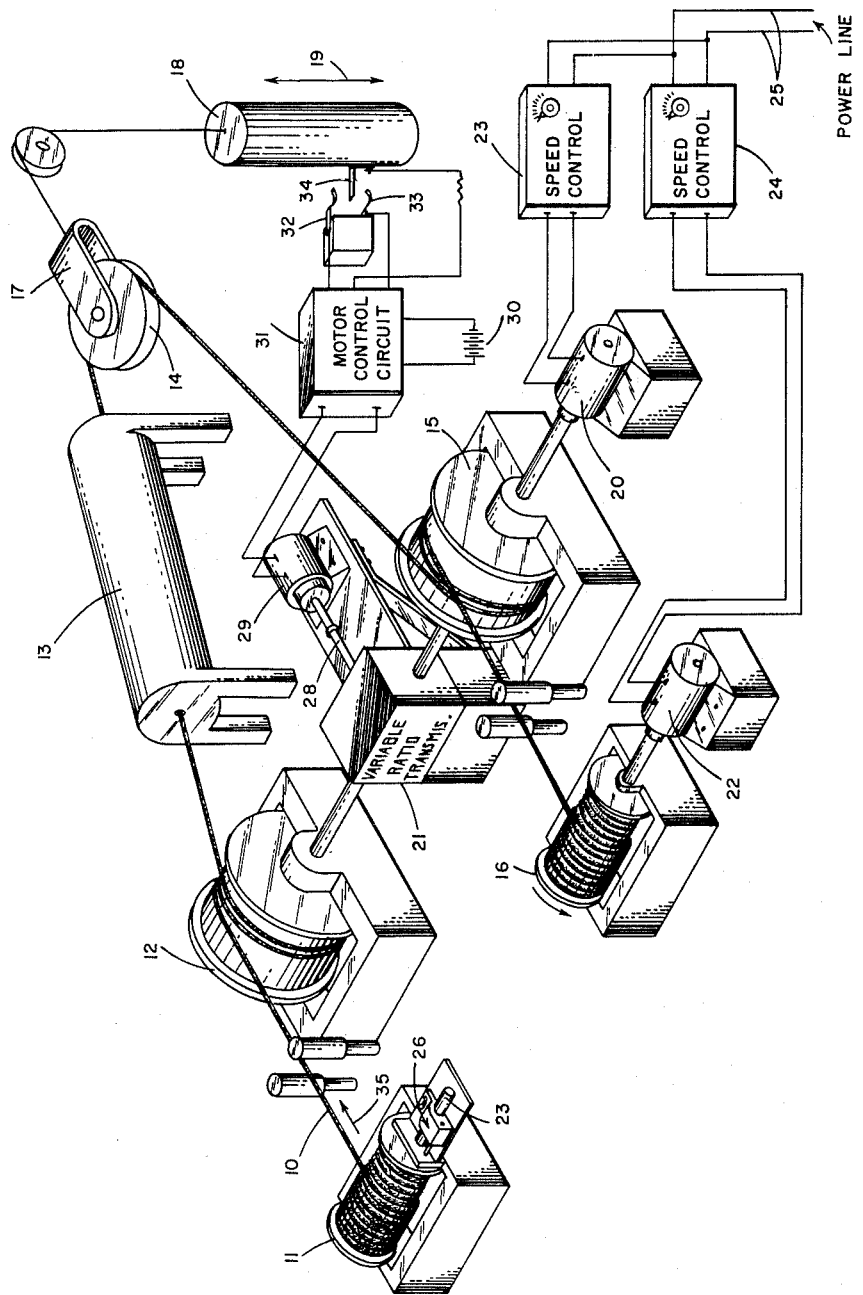

This invention relates to methods for processing cables and, more particularly, pertains to new and improved methods for treating armored electric cables to achieve a desired physical characteristic.

In many applications it is important that the physical length of a cable either be fixed or, if it changes, be determinable. This is significant, for example, in well logging where an instrument is lowered into a well on an electric cable and the depth of the instrument is determined by measuring the amount of cable paid out. Usually, the length of cable in such an application changes with temperature and with cable tension, but these changes can be calculated from temperature and tension data previously obtained. However, if an irreversible deformation occurs resulting in permanent elongation, the exact cable length cannot be determined accurately enough to establish the depth of the logging instrument in the well with a desired precision.

Experience has shown that a cable, whose length was measured under a set of standard conditions, varied in length throughout the life of the cable. This occurred relatively rapidly when the cable was first put into use, but more slowly later on. Accordingly, cables have been prestressed, for example, by rewinding at a predetermined tension, higher than might be encountered in routine service. However, although this process has reduced it has not eliminated permanent alongation.

It is an object of the present invention, therefore, to provide new and improved methods for treating armored electric cables to provide greater length stability than heretofore possible.

As used herein, the term "length stability" is intended to denote the property of a cable always to have the same length when it is measured under a set of standard conditions, regardless of what happened to the cable in the time interval between measurements. This may be distinguished from the "elastic elongation" which is a change in cable length with tension, or the "thermal elongation" which is a change in cable length with temperature.

Thus, another object of the present invention is to provide new and improved methods for treating armored electric cables so as to minimize permanent elongation.

These and other objects of the present invention are achieved by heating a cable to an elevated temperature, and applying tension to the cable while it is substantially at the elevated temperature for a length of time sufficient to insure length stability. According to a specific aspect of the invention, the cable may be additionally subjected to at least one bend.

The novel features of the present invention are set forth with particularity in the appended claims. The present invention both as to its organization and manner of utilization, together with further objects and advantages thereof, may best be understood by reference to the following description taken in connection with the accompanying drawing. In the drawing, the single figure is a schematic representation, in perspective view, of apparatus which may be employed to carry out the process embodying the invention.

Although the process embodying the present invention is applicable to any cable comprised of at least a central core and an outer sheath or armor, it is especially suited for treating electric cables of this type. Thus, the invention will be described as applied to a cable in which a plurality of insulated electric conductors are distributed about a central core and enclosed by a protective braid. The braid is enclosed by an inner armor of closely spaced, helically wound strands, in turn, enclosed by an outer armor of helically wound strands.

More specifically, a cable which has been successfully treated to minimize permanent elongation is composed as follows:

| Component | Size | Description |
| --- | --- | --- |
| Cable itself | 0.522 inch nominal dia. | |
| Outer armor | 24 strands wire, each wire 0.054 inch dia. | Galvanized steel; wound helically with 20° lay angle. |
| Inner armor | 24 strands galvanized steel wire, each wire 0.044 inch dia. | Galvanized steel; wound helically with 20° lay angle, but opposite to inner armor. |
| Braid | | Nylon. |
| Conductors | 6, each comprised of 7 strands of wire .036 inch dia. | Copper covered by rubber insulation 0.1050 inch O.D.; cotton filler in spaces between the 6 insulated conductors. |
| Center filler | | Rubber. |

It is understood that the foregoing example is presented purely by way of illustration as an aid to the understanding of the invention and in no way should be considered as limiting the scope of the invention.

In carrying out the invention, the cable to be treated is placed under tension at a force high enough to produce complete compaction of the core, but lower than the breaking strength of the cable. For example, the tension may be in a range from a small fraction to two-thirds of the breaking strength. In the case of the exemplary electric cable just described, a tension of 6000 pounds is used.

While the cable is under tension, it is heated to a temperature above that at which the core of the cable can experience plastic deformation, but below the point at which the cable is damaged. Thus, the temperature may be in a range from room temperature (approximately 70° F.) to a few degrees below the point at which the cable is damaged. For example, the temperature range may extend to 350° F. In the illustrative case, the cable is heated to a temperature in the neighborhood of 210° F.

If desired, the cable may be heated to the required temperature prior to the application of tension, or tension and temperature may be applied simultaneously. In any event, the tension and temperature conditions are maintained for a period long enough for the compaction of the core to become substantially permanent. For example, the time of treatment may be in a range from a few seconds to several hours although it has been found in practice that exposures of a few minutes are appropriate.

Following the foregoing steps, the cable is permitted to cool toward a temperature at which the cable can be handled.

In accordance with a specific aspect of the present invention, an increase in length stability may be achieved by subjecting the cable to at least one bend while it is exposed to the tension and temperature conditions described above. For example, the cable may be passed over an appropriate member during the treatment so that it is bent through a selected angle, such as 180°. If desired, additional bending may be performed.

A cable of the specific type described hereinbefore showed a marked improvement in length stability after being treated in accordance with the present invention, referred to hereinafter as hot prestressed cable. Data on permanent elongation for hot prestressed cable as well as cables prestressed at ambient temperature (cold prestressed) is presented in the following table for comparison purposes.

*Permanent Elongation After Six Pulls at 10,000 lbs. Each*

| Test Temperature | 70° F. | 212° F. |
| --- | --- | --- |
| Hot Prestressed Cable | 0.45 ft./1,000 ft. | 0.9 ft./1,000 ft. |
| Cold Prestressed Cable | 1.6 ft./1,000 ft. | 2.0 ft./1,000 ft. |

It is thus evident that treatment of cables in accordance with the present invention minimizes the amount of permanent elongation that the cable will show in service. The reason for such improvement may be explained in view of the following considerations. This analysis, however, is presented purely as an aid to an understanding of the present invention and is not to be taken as limiting the scope of the invention in any way.

When a cable is put under tension, the cable core is compressed to a considerable degree. Very often, it is submitted to a pressure of several thousand pounds per square inch when the armor is put under several thousand pounds tension. The length of a cable under tension is determined by an equilibrium between core compression and armor tension. It might be inferred that the slow creep which occurs during the life of a cable originates in the slow progressive compaction of the core rather than in a creep of the wires in the armor. Thus, by accelerating the compaction of the core through the use of heat, length stability is appreciably increased because most of the permanent elongation takes place before the cable is put in service.

To carry out the method embodying the present invention, apparatus of the type illustrated in the drawing may be employed. In this apparatus, a cable 10 to be treated passes from a storage drum 11 to a first capstan 12 and after being looped around the capstan, the cable passes through a conventional oven 13. Before the cable cools appreciably, it is bent through an angle of nearly 180° by means of a sheave wheel 14, and then it is looped around another capstan 15 before being wound on a take-up drum 16.

To control the tension on cable 10, a traveling support 17 for sheave wheel 14 is connected to a weight 18 which can move up and down along a path 19. The weight is appropriately selected to apply the desired tension to cable 10 and its position is automatically controlled in a manner to be described hereinafter.

Movement of cable 10 is controlled by means of an electric motor 20 mechanically connected to capstan 15 and a variable ratio transmission 21 mechanically coupling capstans 12 and 15 to one another. Another electric motor 22 is coupled to take-up drum 16 and the motors are electrically connected to respective, conventional speed control units 23 and 24, in turn, connected to an electric power line 25. Movement of storage drum 11 is inhibited slightly by means of a conventional brake 26 acting on a shaft 27 connected to the drum.

Variable-ratio transmission 21 may embody any known organization of mechanical, electrical, or hydraulic components, or any combination of elements arranged so that the transmission ratio between capstans 12 and 15 can be controlled by a shaft 28 coupled to a motor 29. Motor 29 is energized by a source of electrical energy such as a battery 30 via a conventional motor control circuit 31. The control circuit is coupled to a pair of fixed contacts 32 and 33 that are positioned on opposite sides of a contact 34 connected to and movable with weight 18.

In operation, driving power is supplied to motor 20 so that capstan 15 draws cable 10 continuously from drum 11 in the direction of arrow 35 through oven 13, and around sheave wheel 14. The temperature in oven 13 is maintained at a value such that at a given speed of cable through the oven, the armor and the core of the cable reach a desired temperature. Moreover, a braking force is developed in capstan 12 by means of transmission 21. The cable, after leaving the oven, cools relatively slowly so that in traveling between oven 13 and capstan 15, it remains at the required temperature and tension conditions for several minutes. If desired, a thermally-insulating enclosure may be provided to assure a desired exposure time in which the bend around sheave wheel 14 can be performed.

Motor 22, of course, is controlled so that cable from capstan 15 is taken up on drum 16 while drum 11 is inhibited slightly by brake 26. Thus, the process embodying the present invention may be carried out continuously over the entirety of the cable.

As pointed out above, the braking energy developed on capstan 12 helps drive capstan 15 by means of transmission 21, so that power line 25 need only supply a relatively small amount of energy, the amount necessary to overcome friction and to stretch cable 10 by an amount equal to the permanent elongation taken. The energy spent on one capstan to stretch the cable elastically is recuperated on the other capstan.

As permanent elongation occurs, weight 18 tends to move along path 19 and contact 34 may engage either of fixed contacts 32 or 33. Depending upon which of the fixed contacts is engaged, control circuit 31 energizes motor 29 so as to rotate shaft 28 in a direction to effect a transmission ratio at which contact is broken. Thus, by controlling transmission 21, the up and down travel of weight 18 is maintained between fixed limits regardless of the length of the cable which is being prestressed and the amount of permanent elongation that occurs.

Instead of using an electrical control system for adjusting transmission 21, this may be done mechanically. For example, a direct mechanical link can be appropriately coupled between weight 18 and shaft 28 of transmission 21, or a hydraulic system can be provided and arranged so that the motion of weight 18 operates a valve which controls the transmission.

Of course, if desired, transmission 21 may have a fixed ratio. In this case the travel path 19 for weight 18 must be long enough to accommodate the total permanent elongation taken by the entire cable.

In an alternative arrangement weight 18 is replaced by a piston moving in a hydraulic cylinder in which the pressure of the fluid controls the cable tension. Either a fixed or a variable-ratio transmission 21 can be used in the same manner with the piston as described in connection with the weight.

If desired a tension responsive element may be used to connect member 17 to a fixed point and signals from the tension element may be used to control the ratio of transmission 21 so as to control the tension of the cable.

Although a single sheave 14 has been shown to provide one bend of nearly 180° in cable 10, obviously any angular amount of bend as well as any desired number of bends may be provided. In the latter case, additional sheave wheels like wheel 14 may be employed.

The cable under treatment may be heated in any of a variety of ways. For example, the oven 13 may include a jacket into which the cable and heated gases pass or it may have an electrical resistance heater. Alternatively, the cable may be passed directly through a heated liquid bath, directly through a flame or over a preheated capstan. If desired, electrical induction heating may be employed.

In general, it is desirable that the cable reach the proper combination of tension and temperature for a sufficient duration. Thus, the oven temperature must be selected in view of the amount of time spent by the cable in the oven. For example, tests have shown that the armor of an electric cable of the specific type described hereinbefore experienced a temperature rise from 80° F. to 200° F. in 2¼ minutes at an oven temperature of 550° F. It is therefore evident that to assure a core temperature of 210° F., the cable should be heated for at least 3 minutes. If the oven has a heated zone, for example, ten feet in length, the speed of motor 20 should be adjusted to drive cable 10 at a speed of 1⅔ ft./min.

Furthermore, it is important that in the event the cable is stopped, the oven heat must be shut off to avoid damage to the cable. This may be done, for example, by employing a speed responsive device (not shown) coupled to cable 10 and supplying a signal to a control mechanism (not shown) for oven 13 whenever the speed drops below 1⅔ ft./min. The control mechanism then automatically interrupts the source supplying energy to the oven.

If desired, oven 13 may be situated between drum 11 and capstan 12 so that heating may take place prior to the application of tension.

Of course, if a relatively low oven temperature and low cable speed are used, i.e. an oven temperature very close to the ultimate cable temperature, stoppage of the cable will not result in damage. Consequently, automatic shut-off would not be needed.

Another arrangement for using low temperatures includes a housing for drum 11 into which a heated gas is fed. Thus, the entire amount of cable on the drum can be brought to a required temperature before the cable is placed under tension. For example, steam at 212° F. may be employed for this purpose.

While particular embodiments of the present invention have been described, it is apparent that changes and modifications may be made without departing from this invention in its broader aspects, and therefore the aim in the appended claims is to cover all such changes and modifications as fall within the true spirit and scope of this invention.

I claim:

1. The method of prestressing substantially the entire length of cable to be used under conditions of tension and which includes a central core of elastomer material capable of taking a permanent deformation, a plurality of insulated conductors distributed about said core and an outer, ductile, high-tensile strength, metallic sheathing, comprising the steps of: heating the cable to a temperature between the temperature of plastic deformation of said elastomer material and the flow temperature thereof, and applying a substantially constant tension to the cable of less than two-thirds of the breaking strength thereof while the cable is at substantially said temperature, whereby the core is permanently compacted and the cable is permanently elongated to a length stable condition.

2. The method of prestressing substantially the entire length of cable to be used under conditions of tension and which includes a central core of elastomer material capable of taking a permanent deformation, a plurality of insulated conductors distributed about said core and an outer, ductile, high-tensile strength, metallic sheathing, comprising the steps of: heating the cable to a substantially constant temperature, said constant temperature being between the temperature of plastic deformation of said elastomer material and the flow temperature thereof, applying a substantially constant tension to the cable of less than two-thirds of the breaking strength thereof while the cable is at substantially said constant temperature, and bending the cable while the cable is substantially at said tension and said constant temperature, whereby the core is permanently compacted and the cable is permanently elongated to a length stable condition.

3. The method of prestressing substantially the entire length of cable to be used under conditions of tension and which includes a central core of elastomer material capable of taking a permanent deformation, a plurality of insulated conductors distributed about said core and an outer, ductile, high-tensile strength, metallic sheathing, comprising the steps of: passing the cable through a zone of elevated temperature to raise successive core portions to a substantially constant temperature, said constant temperature being between the temperature of plastic deformation of the elastomer material and the flow temperature thereof, and applying a substantially constant tension to successive portions of the cable while at substantially said constant temperature, said constant tension being greater than the maximum tension when used and less than two-thirds of the breaking strength of the cable, whereby the core is permanently compacted and the cable is permanently elongated to a length stable condition.

4. The method of prestressing substantially the entire length of cable to be used under conditions of tension and which includes a central core of elastomer material capable of taking a permanent deformation, a plurality of insulated conductors distributed about said core and an outer, ductile, high-tensile strength, metallic sheathing, comprising the steps of: passing the cable through a zone of elevated temperature to raise successive core portions to a substantially constant temperature, said constant temperature being between the temperature of plastic deformation and the flow temperature thereof, applying a substantially constant tension to successive portions of the cable while at substantially said constant temperature, said constant tension being greater than the maximum tension when used and less than two-thirds of the breaking strength of the cable, and bending successive portions of the cable while at substantially said constant tension and temperature, whereby the core is permanently compacted and the cable is permanently elongated to a length stable condition.

5. An article of manufacture comprising a length of hot prestressed cable to be used under conditions of tension comprising: a central core comprised of an elastomer material capable of taking a permanent deformation; a plurality of insulated conductors distributed about said central core; a protective covering enclosing said conductors; an inner armor of closely spaced helically wound metallic strands disposed about said conductors; an outer armor of closely spaced helically wound metallic strands disposed about said inner armor and inclined opposite to said inner strands; said strands being comprised of ductile and high-tensile strength metal; said central core being permanently compacted by the application of heat to a temperature between the temperature of plastic deformation of said elastomer material and the flow temperature thereof and a constant tension of less than two-thirds of the breaking strength of the cable while the cable is at substantially said temperature so that said cable is permanently elongated to a length stable condition prior to its initial use under conditions of tension.

6. The method of manufacturing an armored cable comprising insulating at least one metallic conductor with electrical insulation capable of taking a permanent deformation, helically applying a first layer of metallic armor wires over the insulated conductor, helically applying a second layer of metallic armor wires over the first layer in an opposite direction of wind to the first, heating the cable to a temperature between 70° and 350° F., said temperature being above that at which said insulation can experience plastic deformation but below the point at which it is damaged, and applying a tension to the cable while so heated of less than two-thirds of its rated strength, whereby said insulation is permanently compacted and the cable permanently elongated to a length stable condition.

7. The method of manufacturing an armored cable comprising insulating at least one metallic conductor with electrical insulation capable of taking a permanent deformation, helically applying a first layer of metallic armor wires over the insulated conductor, helically applying a second layer of metallic armor wires over the first layer in an opposite direction of wind to the first, heating the cable to a temperature between the temperature of plastic deformation of said insulation and the flow temperature thereof, and applying a tension to the cable while so heated of less than two-thirds of its rated strength, whereby said insulation is permanently compacted and the cable permanently elongated to a length stable condition.

References Cited by the Examiner
UNITED STATES PATENTS

| | | |
|---|---|---|
| 1,977,209 | 10/34 | Sargent. |
| 2,050,298 | 8/36 | Everett _____ 205—21 |
| 2,199,879 | 5/40 | Deroche _____ 205—1 |
| 2,291,540 | 7/42 | Fearn _____ 29—547 XR |
| 2,479,353 | 8/49 | Hansell. |
| 2,610,286 | 9/52 | Cox. |

EARL M. BERGERT, *Primary Examiner.*

WHITMORE A. WILTZ, JOSEPH C. MANIAN, CARL F. KRAFFT, *Examiners.*